UNITED STATES PATENT OFFICE.

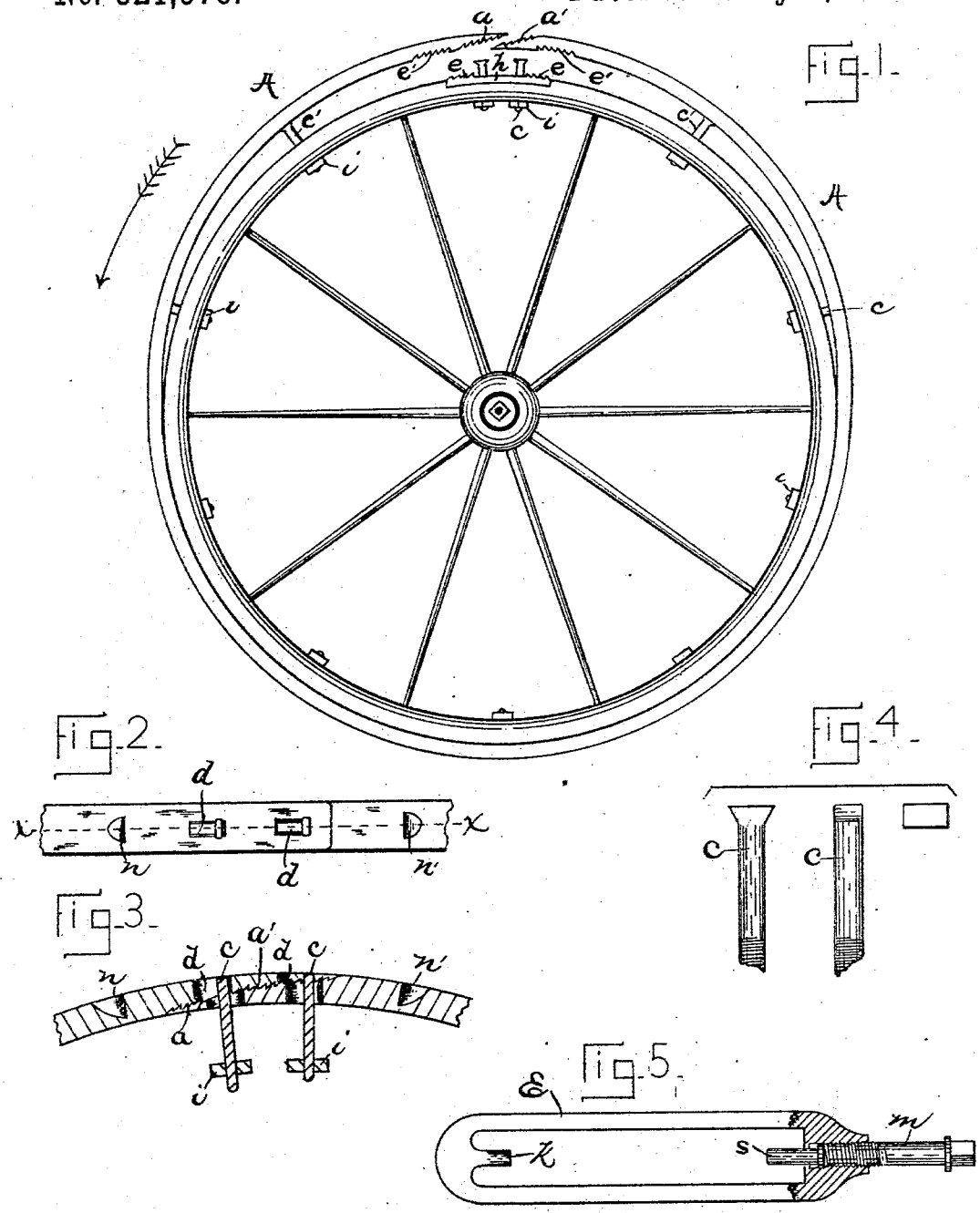

HENRY A. BURLINGAME, OF GRISWOLD, CONNECTICUT, AND ELISHA S. BURLINGAME, OF CENTRAL FALLS, RHODE ISLAND.

TIRE-TIGHTENER.

SPECIFICATION forming part of Letters Patent No. 321,578, dated July 7, 1885.

Application filed November 20, 1884. (No model.)

*To all whom it may concern:*

Be it known that we, HENRY A. BURLINGAME, of Griswold, in the county of New London and State of Connecticut, and ELISHA S. BURLINGAME, of Central Falls, Providence county, Rhode Island, have invented certain new and useful Improvements in Wagon-Tires and Means for Tightening and Locking the Same, which improvements are fully set forth and described in the following specification, reference being had to the accompanying drawings.

Our improvements relate to a new method of joining and fastening the ends of an open wagon-tire and to certain details of construction whereby said tire may be quickly tightened when necessary, our immediate object being to provide a more convenient and less expensive method than has heretofore been in common use.

In the annexed drawings, Figure 1 represents a carriage-wheel with our new form of tire partially attached, the free ends of the same being shown opened. Fig. 2 is a top view, somewhat enlarged, of that portion of the tire which relates to the locking-joint, the same being shown locked. Fig. 3 is a sectional view on line $xx$ of Fig. 2. Fig. 4 shows side, edgewise, and end views of one of the bolts which we use to secure the tire to the rim or felly. Fig. 5 is a top view of the screw-clamp by means of which the two ends of the tire are brought together to adjust and lock the same.

The process of removing, heating, and shrinking on a tire which has been in common use heretofore has the following acknowledged objections, which it is our purpose to avoid: first, the cost of frequently removing and setting the tire when done by a blacksmith; second, the inconvenience of going to the blacksmith-shop and the necessary loss of time while waiting for the work to be done; third, the marring and burning of the painted rims which invariably accompanies the process of heating and shrinking on a tire.

With our new adjustable device, should a spoke or any other portion of the wheel become loosened, with a tendency to rattle, the tire may be quickly tightened and fastened without expense and without leaving the barn, in the manner hereinafter fully described.

In Fig. 1 we have shown a wheel having the usual form of hub, spokes, and felly. The tire A is of any suitable material—such as iron or steel—and is so cut diagonally at the ends that when drawn together said ends overlap each other and form a continuous metallic band or ring. Each of the diagonally-cut surfaces is serrated or notched, as shown at $a\ a'$, the notches $a'$ being of such size and so located that they may enter and interlock with the corresponding notches, $a$. Our tire is secured to the wheel by bolts $c$, having the usual form of tapered head, but having said head milled down or otherwise flattened on two opposite sides to the size of the body of the bolt, as shown in Fig. 4. The openings in the tire to receive the bolt-heads are elongated somewhat, forming slots $d$, whose side walls at the outer edge are beveled or chamfered to correspond with and receive the beveled bolt-heads. It will now be understood that the bolts may be turned one-quarter around and the tire slipped over and away from said bolts, as at $c'\ c'$, Fig. 1, so that in resetting or adjusting the tire said bolts need not be drawn out of the felly. One or more of these elongated openings, $d$, we prefer to have located in the lapped joint, so that the serrations $a\ a'$ may be securely locked into each other, with no possibility of becoming loosened or of drawing apart.

As an auxiliary lock, which may be used when desired, we have provided the segment $h$, which is let into the wooden felly, and is provided with notches $e$, to engage corresponding notches, $e'$, on the inner side of the ends of the tire.

Our invention is used as follows: When it is desired to tighten the tire, the several nuts $i$ are loosened and the clamping device E (shown in Fig. 5,) applied. Said clamping device is constructed of metal, is formed with a central longitudinal opening somewhat wider than the tire, and has at one end a stud, $k$, formed preferably as an integral part of said frame. The opposite end of said frame is drilled nearly through and tapped to receive a screw, $m$, whose outer end is squared or slotted to receive a screw-driver or wrench, as desired. The bottom of the screw-hole is drilled through somewhat smaller than the body of screw $m$, and a headed pin, $s$, entered in said opening. The screw $m$ is now turned into place, as shown in Fig. 5, and it will be evident that when said screw is forced home it must carry before it the pin $s$. Near the ends of the tire are depressions $n$ $n'$, in one of which rests the stud $k$, and in the other the inner end of pin $s$. As the screw $m$ is turned into the frame E the ends of the tire will be forced past each other, the elongated slots allowing said tire to be drawn tightly around the felly and tightening the several parts of the wheel. As the notches $a$ $a'$ pass each other they snap into place, and when the tire is brought to the desired tension the several nuts are screwed up, and the clamp E may then be removed. The corners of the outer end of the tire are rounded slightly, as shown in Fig. 2, to prevent them from becoming battered or upset against the rub-iron, stones, or other objects which it may come in contact with. Whenever it becomes necessary to remove the tire from the wheel, the nuts $i$ should be loosened and the bolt-heads turned one-quarter around, when the tire may be slipped over said bolt-heads and removed.

Our device may be applied to tub and tank hoops or to any metallic band which needs occasional tightening or adjusting.

We are aware that open tires have been used heretofore, and do not therefore claim, broadly such a form of tire.

What we do claim as new, and wish to secure by Letters Patent, is—

1. In combination with a continuous wooden felly, an open tire having its ends cut diagonally to form a lap, said diagonal engaging-surfaces being provided with serrations or notches which interlock with each other when the tire is in place, suitable bolts for securing the tire to the felly, and depressions, substantially as described, by which a clamping device may be applied to tighten said tire on said felly, all substantially as and for the object set forth.

2. In combination with the felly of a wagon-wheel, the metallic segment $h$, having on its outer side notches $e$, and a tire having notches $a$ $a'$ on the engaging-surfaces of the lap, and notches $e'$, so located that when the tire is secured rigidly in place on the felly notches $e$ will enter notches $e'$, the complete tire being secured to the felly by a series of bolts passing through said felly and tire, all substantially as and for the purpose set forth.

3. A tire having diagonally-cut ends formed with engaging notches $a$ $a'$ and elongated bolt-slots whose outer portion is enlarged to receive and support the beveled bolt-heads, in combination with a suitable felly and bolts, whose heads are so flattened that a quarter-turn of said bolts will release the tire, all as and for the purpose specified.

HENRY A. BURLINGAME.
ELISHA S. BURLINGAME.

Witnesses as to signature of Henry A. Burlingame:
FRANK H. ALLEN,
TYLER J. HOWARD.

Witnesses as to signature of Elisha S. Burlingame:
WILLIAM H. GOODING,
SAML. L. PENDERGRASS.